Dec. 14, 1926.

G. M. WILLIS

CHECK WRITER

Filed June 30, 1921  6 Sheets-Sheet 1

Inventor
George M. Willis
By Brown Boettcher & Dienner
Attorneys

Dec. 14, 1926.  
G. M. WILLIS  
CHECK WRITER  
Filed June 30, 1921

Inventor  
George M. Willis  
By Brown Boettcher Dienner  
Attorneys

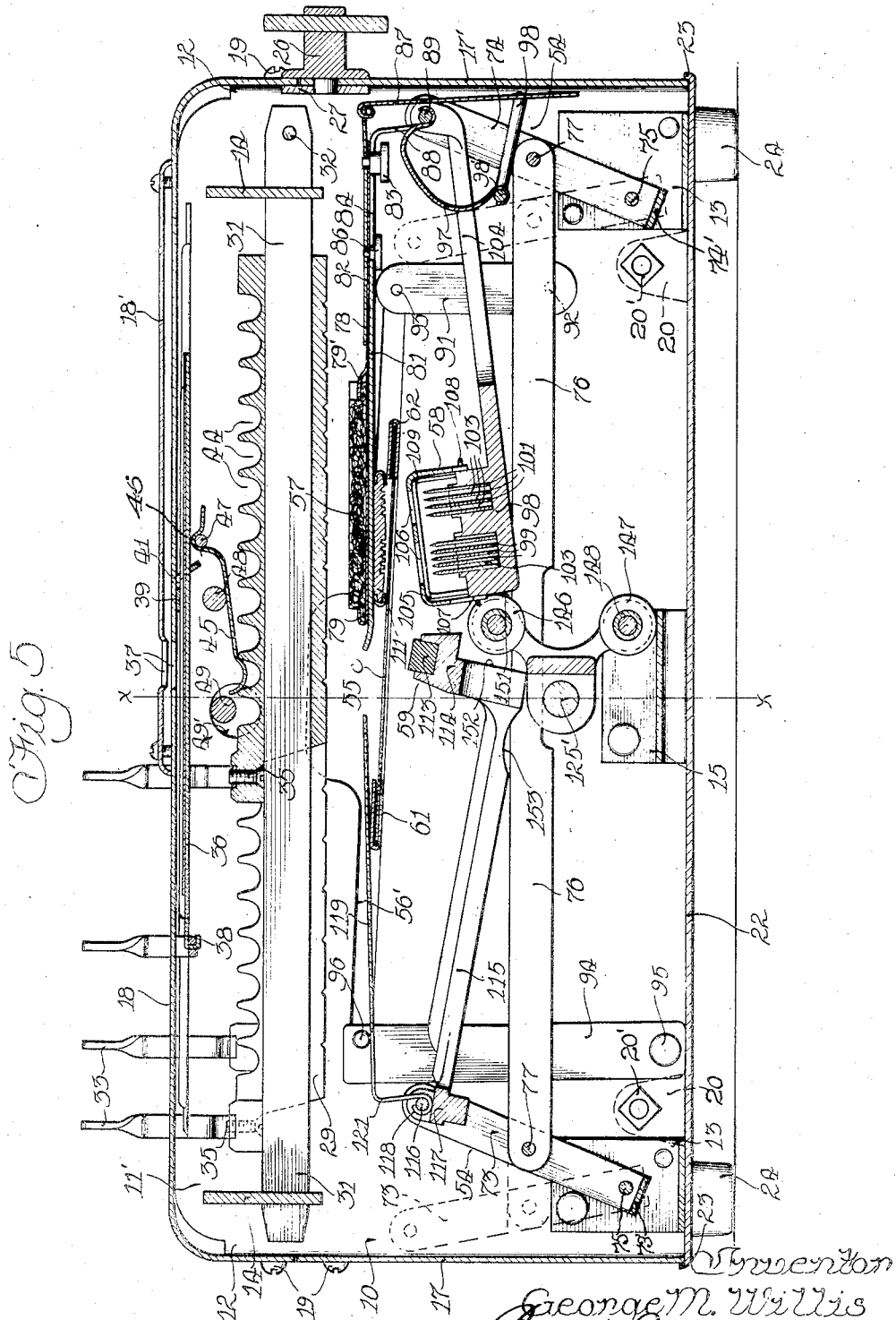

Dec. 14, 1926.
G. M. WILLIS
1,610,640
CHECK WRITER
Filed June 30, 1921    6 Sheets-Sheet 4
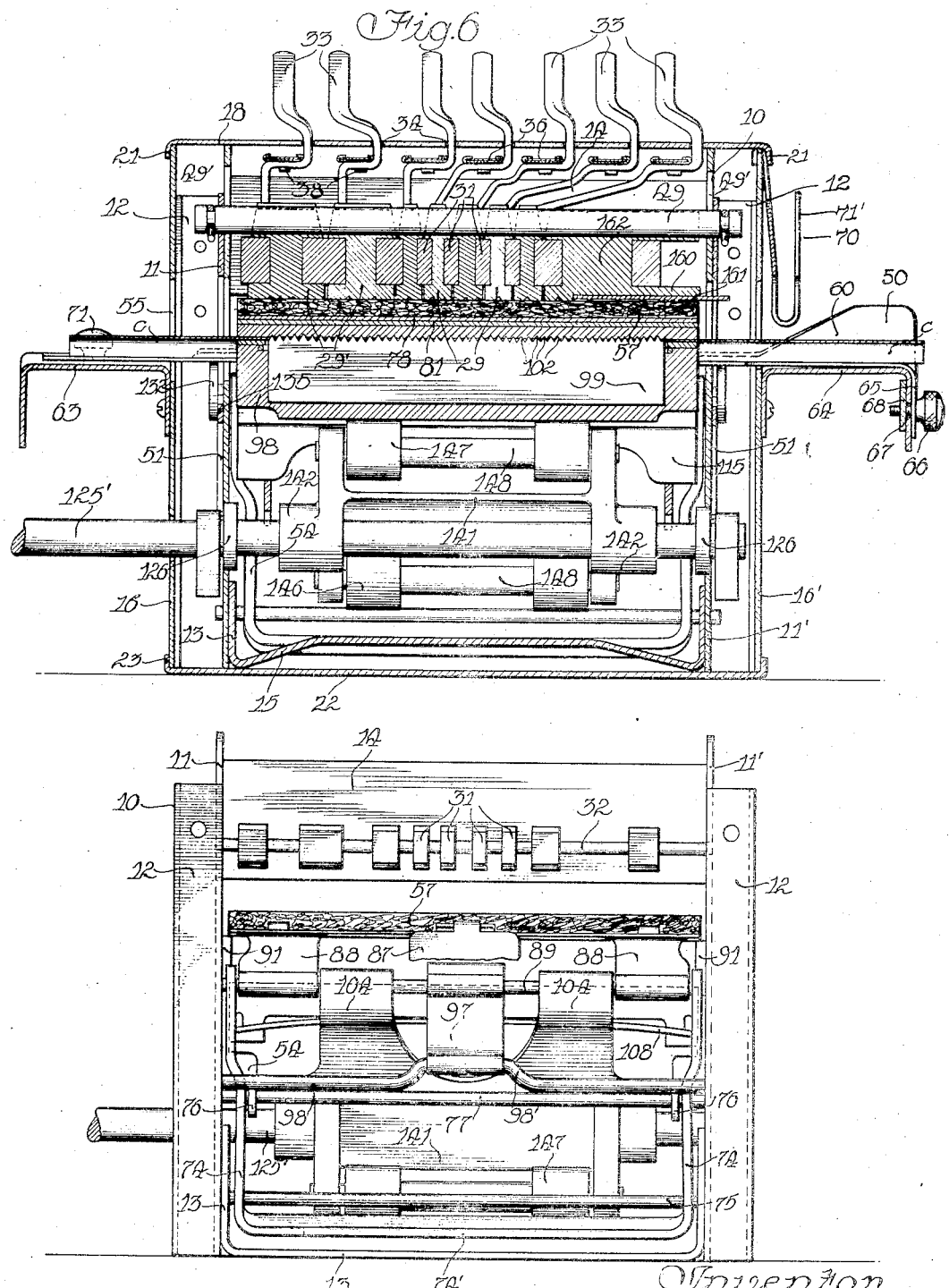

Dec. 14, 1926.
G. M. WILLIS
CHECK WRITER
Filed June 30, 1921        6 Sheets-Sheet 5
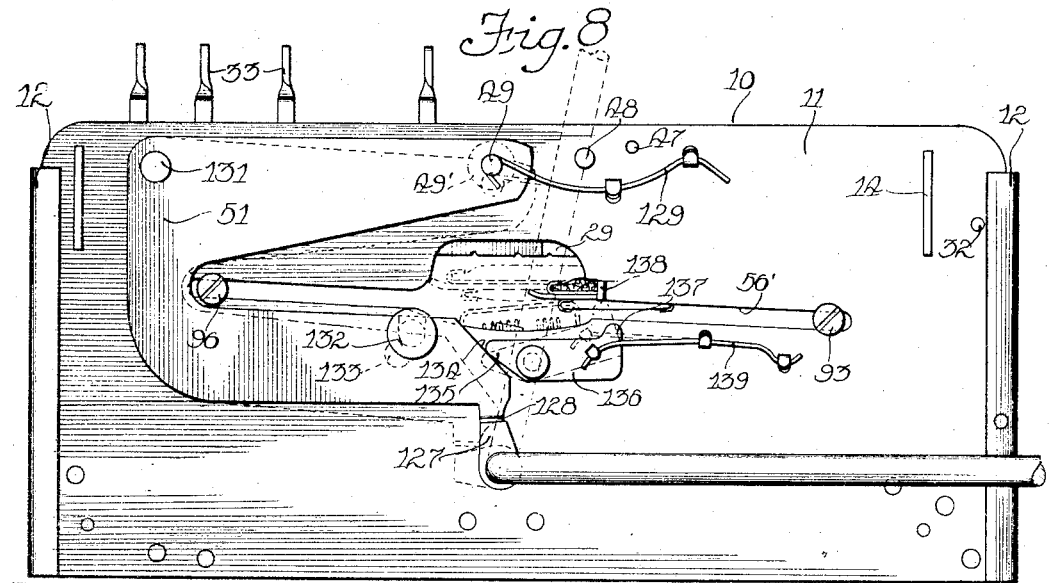
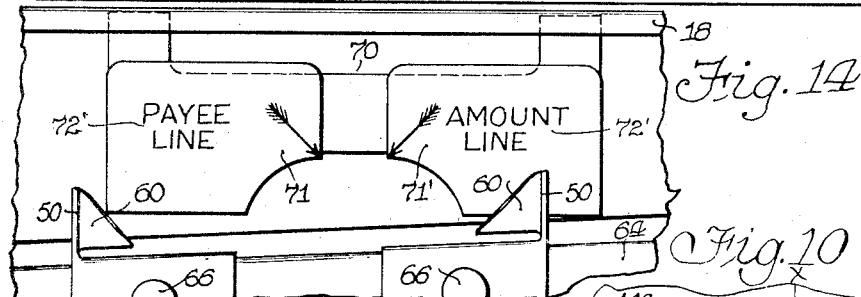
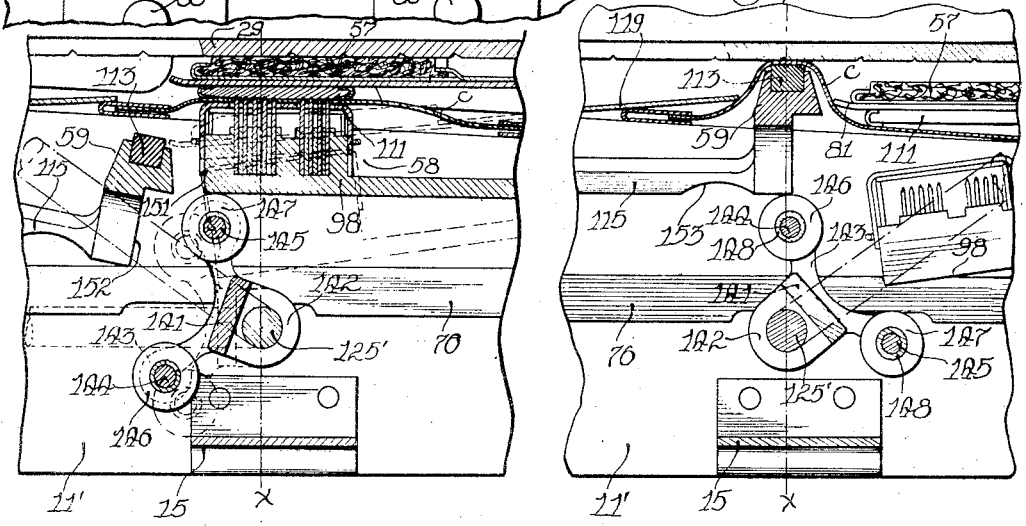

Dec. 14, 1926.
G. M. WILLIS
CHECK WRITER
Filed June 30, 1921     6 Sheets-Sheet 6
1,610,640
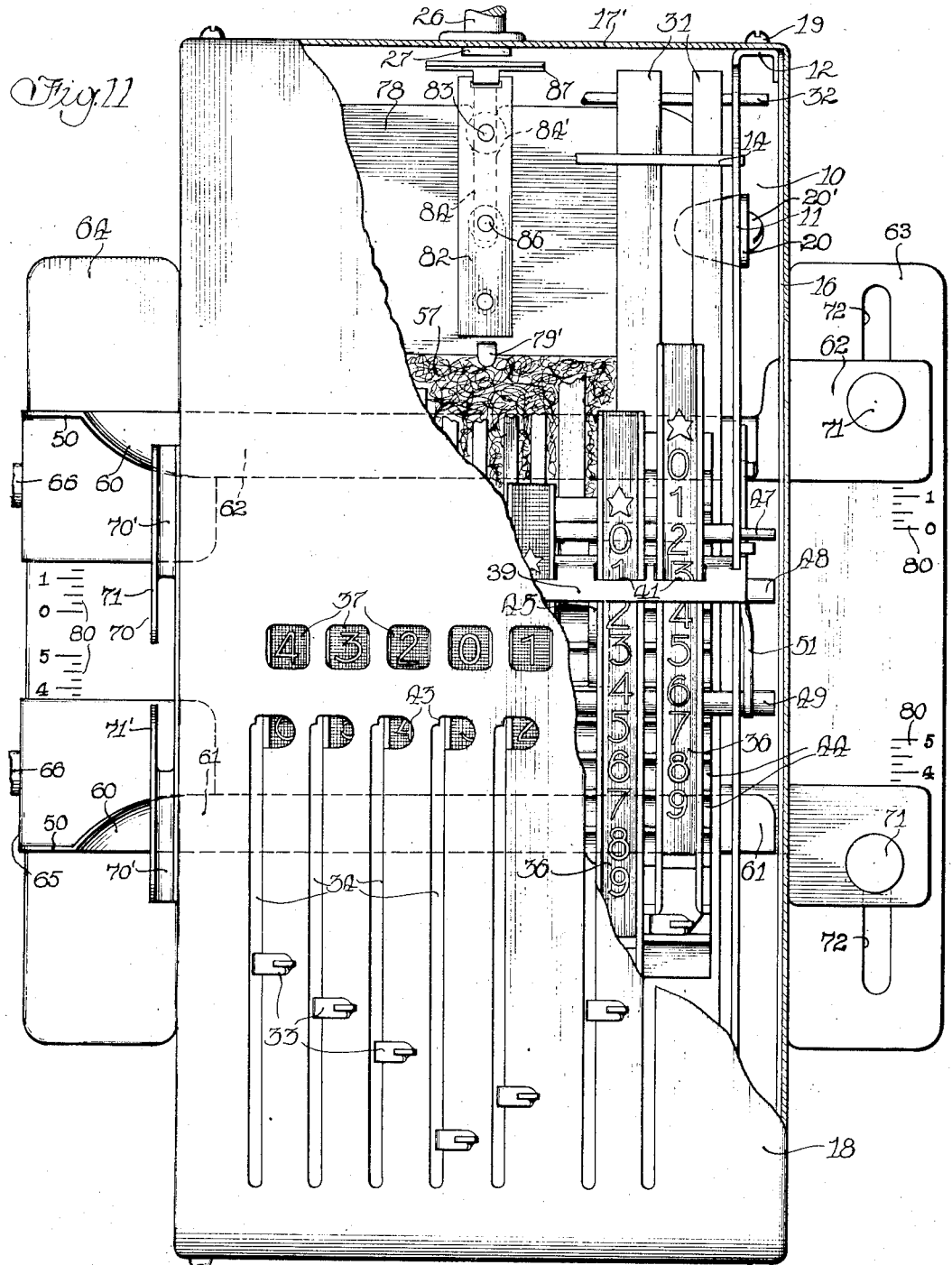
Inventor
George M. Willis
By Brown Batcher Dinner
Attorneys Patented Dec. 14, 1926.

1,610,640

UNITED STATES PATENT OFFICE.

GEORGE M. WILLIS, OF CHICAGO, ILLINOIS, ASSIGNOR TO CHECKOMETER SALES CO., OF CHICAGO, ILLINOIS, A CORPORATION OF ILLINOIS.

CHECK WRITER.

Application filed June 30, 1921. Serial No. 481,632.

The present invention relates to check writers, and is an improvement upon the construction of check writer disclosed in my previous Patent No. 1,321,348 issued November 11, 1919.

According to the general theory of operation involved in this previous construction, the check or other negotiable instrument is protected by first perforating a definite area thereof by a plurality of fine, sharp, perforating points, and thereafter printing the amount payable or other desired data in this perforated area by appropriate type characters designed to ink the upstanding edges of the paper around the perforations and to also compress the edges of these perforations back into the plane of the sheet in producing the printed characters. One of the particular objects of the present invention is to improve upon this prior method of protecting checks in such a manner as to make the printed characters more distinct and legible and to make them more permanent as against alteration or removal. This is accomplished in the present construction by leaving the printed characters raised above the plane of the surrounding field in uninked relief through the operation of inking and compressing only the portion of the perforated field which surrounds the printed characters. This forms a background of solid color against which the raised uninked printed characters stand out in sharp contrast. In the present embodiment of machine the parts are preferably so arranged as to give the effect of relief as a result of the perforations or incisions produced in the paper. According to this preferred embodiment this follows from providing perforations or incisions in the characters themselves, which perforations or incisions disrupt the texture of the paper and raise the broken paper fibers within the characters above the plane of the surrounding field. In protecting a check in this manner, the first operation is to perforate or mutilate a given area of the check by cutting a solid, closely grouped series of perforations or incisions in the paper. Thereafter this solid field of perforations is inked and compressed by intaglio or incised type. The intagliotype is impressed upon the side of the check from which the broken fibers of the paper project, whereby the ink surfaces of the intagliotype impregnates the shredded or mutilated fibers with ink simultaneously with the operation of compressing these raised fibers back into the field of the perforated area. The intagliotype has a cooperative relation with the perforating operation to the end that it allows the broken fibers of the paper lying within the printed characters to stand erect in uninked relief against the inked and compressed fibers in the surrounding field. In the finished check the characters project in slight relief above the plane of the entire check, which is also the plane of the inked field surrounding the characters. However, I also contemplate obtaining the effect of relief by depressing the inked field surrounding the characters below the plane of the check and allowing the uninked, perforated characters to remain in the plane of the check; or, to obtain the same effect, by slightly depressing the inked field below the plane of the check and raising the perforated characters slightly above the plane of the check.

The foregoing method of protecting checks or commercial paper renders the checks extremely difficult to alter without detection owing to the fact that by impregnating the entire perforated background with ink instead of inking the printing characters it is necessary to eradicate a much larger quantity of ink from a large portion of the perforated area before any of the printed characters can be altered or substituted. It is within the scope of my invention to ink only a portion of the perforated field surrounding each character so that the inked portion will have the general configuration of the perforated character.

A further object of the present invention is to provide a check writer embodying improved mechanism for protecting the payee's name against alteration or substitution. This improved mechanism is preferably designed to protect the payee's name by finely perforating or disrupting the area in which the payee's name is written, the improved operation residing in the manner in which the entire area containing the payee's name is perforated or disrupted in a single simultaneous perforating operation, performed simultaneously with the operation of perforating and protecting the amount payable.

A further object is to provide improved mechanism for also protecting the drawer's signature against alteration or substitution, by impressing on the check either a recognized trade symbol, the facsimile of the drawee's signature, or other printed matter which will bear a definite relation to the bona fide drawer's signature, the improvement in this protecting mechanism residing particularly in the arrangement whereby the trade symbol, the facsimile of the drawer's signature or other printed matter can be made comparatively fine and of minute detail without having its legibility obscured by perforations in the paper.

A further feature in this regard is to so support and relate the printing member bearing this trade symbol, etc., as to permit this member to be readily interchanged for the convenient substitution of trade symbols, etc.

A further object is to provide improved operating mechanism for mounting and actuating the perforating mechanism, the inking mechanism and the printing platen whereby these mechanisms are successively brought into accurate registration with the printing line of the machine in their proper sequence. A particularly desirable characteristic of this operating mechanism is the fact that it enables the perforating mechanism and the inking mechanism to be brought into engagement with the check and with the type faces under a predetermined pressure of just the proper degree for performing their respective functions, while the printing platen is brought into printing engagement with the check under a considerably higher pressure to properly make the impression.

A further object is to provide an improved arrangement of gripping fingers which operate to grip and retain the check against displacement while the perforating and printing operations are being performed thereon.

Other objects concerned with: the improved construction and assembly of the machine frame and the housing; the motion of the oscillatory frame for moving the several operating mechanisms; the arrangement of the type bars and their indicating members; and other details of construction, will be more fully set forth in the accompanying detail description of a preferred embodiment of the invention taken in connection with the accompanying drawings in which:

Figure 5 is a longitudinal sectional view through the center of the machine;

Figure 6 is a transverse section taken on the plane of the line 6—6 of Figure 9 and looking in the direction indicated by the arrows;

Figure 7 is an end elevational view of the machine, viewed from the right in Figure 5;

Figure 8 is a side elevational view of the machine with the housing removed, illustrating the construction of the machine frame and the relation of the operating parts exterior thereto;

Figures 9 and 10 are fragmentary sectional views illustrating different steps in the operating cycle of the machine;

Figure 11 is a plan view, partly in elevation and partly in section, of the machine;

Figure 14 is a fragmentary side elevational view of the check guide and registry mechanism.

Figure 1:
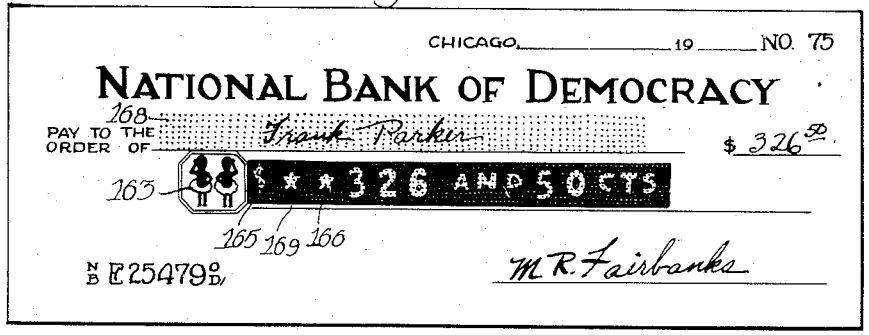
Figure 1 represents a check protected in accordance with the above method of operation.

The operating parts of the machine are supported in an open frame 10 comprising two side plates 11—11' which are stamped out with channels 12 bent backwardly along the vertical ends of the plate. The frame plates are secured together in spaced relation by transverse straps 13 riveted to the lower end corners of the plate (Figure 5), and by upper transverse bars or plates 14 which have their ends rigidly secured in slots in the side plates 11—11'. The side plates are also connected by a central bridge member 15, the ends of which are riveted to the side plates and the center of which is arched to provide a limiting stop for the operating mechanism, as will be presently described. The aforesaid frame is enclosed in a sheet metal housing comprising side and end walls 16—16' and 17—17' and a cover plate 18. The ends of this cover plate are curved downwardly to meet the upper edges of the relatively short end walls 17—17', these downwardly bent ends and the left hand end wall 17 being secured to the channel formations 12 in the frame by screws 19. The longitudinal edges of the cover plate, including the vertical end portions thereof, are formed with short flanges 21 which overlap the adjacent edges of the side walls 16—16' and thus securely confine these side walls against the channel formations 12. The bottom of the housing is closed by a plate 22 which is formed with an upwardly extending marginal flange 23 around its entire perimeter which overlaps the lower edges of the side and end walls and thus securely holds these edges against the frame of the device. In order to secure this bottom plate to the frame small lugs 20 are struck up from the plate to engage outside of the side plates 11—11'. Screws or bolts 20' secure these lugs to the side plates, thus anchoring the bottom plate to the frame. If desired the cross straps 13 may be dispensed with by relying upon the lugs 20 to maintain the proper spacing between the lower edges of the side plates 11—11'. The bottom plate is provided with rubber feet 24 for supporting the device. In order to facilitate access to the inking pad, which will be later described, the right hand end plate 17' is made readily removable through the provision of a knob 26 which controls a locking lug 27 adapted to engage behind the adjacent edge of the cover plate 18. The end walls 17—17' have short flanges 28 which overlie the vertical edges of the side plates 16—16'.

The several operations of: (1) writing and protecting the amount payable; (2) protecting the payee's name, and (3) protecting the drawee's signature are all performed with the check remaining in one stationary position in the machine. In writing and protecting the amount payable there are two successive operations performed on the check consisting of first perforating the entire area of the check in which the amount payable is to be printed and thereafter impressing inked printing characters into this perforated area. Both of these operations occur successively at one point, or rather along one line in the machine, which I shall hereinafter refer to as the "printing line." This printing line is represented by the dotted line x—x in Figures 5, 9 and 10. The intagliotype characters which are adapted to be brought into alignment with this printing line are formed in a plurality of type bars 29 shiftably supported in parallel relation in the upper part of the frame 10. It will be noted that the type bars which carry the characters representing the tens and units of cents (these type bars being designated 29' in Figure 6) are considerably wider than the remaining type bars 29 in order that the word "and" may be associated with each tens character on the tens of units cents bar, and in order that the abbreviation "cts." may be associated with each character on the units of cents type bar. The type bars are all supported between a parallel series of spacing bars 31 of the proper widths for properly spacing the different widths of type bars. The ends of these spacing bars are extended through slots of the same dimension in the transverse plates 14—14, and the series of spacing bars are all linked together against shifting by a pin or rod 32 which is extended through aligned apertures in the ends of the spacing bars and through apertures in the side plates 11 of the main frame. All of the type bars are formed with narrowed intermediate portions to form upper and lower shoulders for engaging over the edges of the spacing bars. The type bars are each provided with operating fingers 33 which are extended through parallel slots 34 in the cover plate 18. The lower ends of these fingers are bent horizontally to set into transverse recesses in the type bars, in which they are secured by screws 35. As viewed in Figure 6, it will be noted that the type bars are grouped to the left hand side of the machine, while the operating fingers of the outermost type bars 29 are inclined diagonally to evenly distribute the projecting ends of the operating fingers 33 across the width of the machine for convenient spacing and accurate operation of the type bars. Each operating finger is bent to form an intermediate horizontal portion to which is secured one end of an indicating slide 36. These indicating slides are of sheet metal construction, either being formed with overlapping flanges along their edges which confine an indicating strip bearing numerals corresponding to the type characters on the type bar and a superposed strip of celluloid to protect the numerals, or having the numerals marked directly on the slides. These numerals are adapted to be exposed through small windows 37 opening through the cover plate 18 and through a superposed plate 18'. It will be noted that by arranging all of the operating fingers 33 for parallel motion along the horizontal top of the machine and by the arrangement of the line of windows and indicating numerals cooperating therewith the operation of setting off a sum on the machine may be performed with maximum convenience and rapidity and the setting given the machine will always be instantly apparent by a mere glance at the line of windows 37. The metallic indicating strips 36 are secured to the horizontal portions of the fingers 33 by short tongues of metal 38 (Figures 5 and 6) which are punched out of the ends of the strips and are looped downwardly through slots in the horizontal portions. The outer ends of the slides move freely under the cover plate 18, being merely guided in a slotted bridge strip 39 extending between the side plates 11—11' and rigidly secured thereto. As shown in Figure 5, this strip is of generally angular section and has a series of individual guide slots 41 for each of the indicating slides 36. It will be noted that the ends of the slots 34 are widened as indicated at 43; this being for the purpose of permitting the ready removal of the cover plate 18 over the ends of the operating fingers 33. The superposed cover plate 18' illustrated in Figure 3 or any suitable strip is arranged to cover the widened ends 43 of the slots 34. The lower edge of the cover plate 18' normally limits the upward movement of the operating fingers 33, but upon removal of this cover plate the type bars can be moved up to their extreme upper positions where the operating fingers register with the enlarged openings 43, whereupon the large cover plate 18 can be removed.

The upper edge of each type bar 29—29' is formed with a series of detent depressions 44, preferably of circular form, in which engages an individual detent finger 45. The several detent fingers for the plurality of type bars are struck out of a plate 46 which is cupped to engage over a transverse rod 47 extending between the side walls of the frame. A second rod 48 extends above the series of detent fingers and imposes a resilient tension thereon for normally pressing the same into the indentations 44. To assist in the accurate centering of the selected type characters along the printing line x—x there is provided a positively operating aligning rod 49 extending through vertical slots 49' in the side plates of the frame and having its ends secured in levers 51 pivoted on the outside of the side plates of the frame. Upon the oscillation of the two side levers 51 on opposite sides of the machine—in a manner which I shall hereinafter describe—the aligning rod 49 is thrust downwardly into the transverse series of depressions 44 of the several type bars, thus positively centering the selected type characters of the type bars on the printing line x—x.

Figure 13:
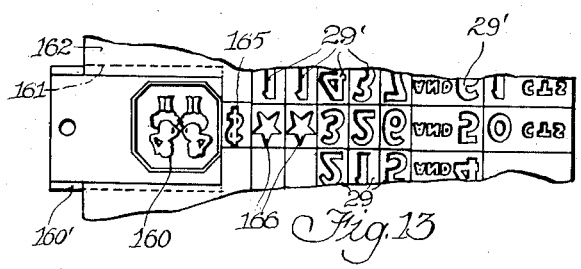
Figure 13 is an inverted fragmentary elevational view of the type bars illustrating the relation of the plate carrying the trade symbol or signature thereto.

Referring to Figure 13, it will be seen that the printing characters 29' on the bottoms of the type bars are in intaglio with the incisions forming the characters relatively deep and wide. These printing characters are therefore not inked by the inking mechanism, which only operates to ink the smooth under surfaces of the type bars. Upon making the impression the inked surfaces of the type bars impregnate the raised fibers of the perforated background with ink and compress these raised fibers back into the plane of the sheet so that a solid inked field is produced. The intaglio type characters leave the raised fibers within the characters uninked and in relief against the flat, solid color field. The edges of these intagliotype characters, which are relatively sharp, also cooperate with a resilient platen as I shall presently describe, to sharply raise the entire body of each character to accentuate the effect of relief produced by the perforations. Any attempt to alter or substitute any of the printed characters necessitates the eradication of all of the ink impregnated in the field surrounding these particular characters, and by reason of the relief form of each character any attempted alteration of a character is likely to result in the character becoming partly or entirely severed from the sheet.

Figure 2:
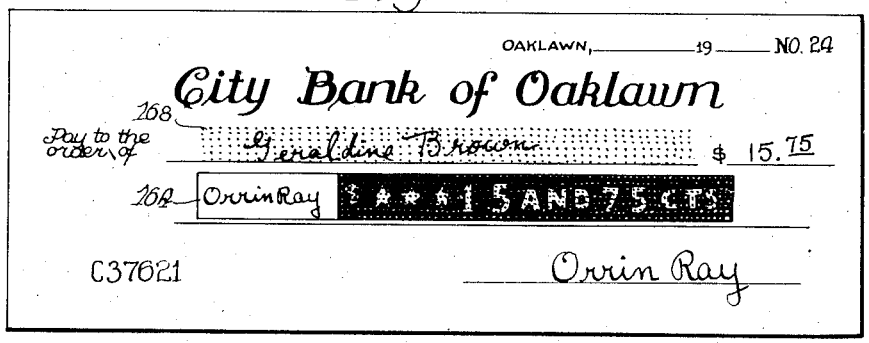
Figure 2 represents a check so protected, illustrating a facsimile of the drawer's signature impressed on the check.

The method I employ for protecting the drawer's signature preferably consists in printing on the check a recognized trade symbol, the facsimile of the drawer's signature, or other matter which will bear a definite relation to the signature itself. This is in preference to perforating the drawer's signature as I do in the case of the payee's name for the reason that the multitude of perforations are likely to obscure or decrease the legibility of the signature which would thus make it more difficult to determine the authenticity of the signature. The trade symbol or other character or characters are formed on a plate or die 160 which is preferably supported in alignment with the aligned printing characters on the type bars, see Figure 13. This plate is formed with beveled edges 160' which are adapted to fit in a dovetailed slot 161 recessed in the lower face of a stationary block 162. This block is rigidly supported between two outermost spacing bars 31 at the forward end of the printing line of characters so as to place the impression before the "amount payable" as indicated at 163 and 164 in Figures 1 and 2. The plate 160 is readily removable from its guideway 161 so that different plates bearing different symbols or characters may be quickly interchanged. The symbol or other protecting matter on the plate may be in ordinary relief type or in intagliotype. As I shall hereinafter describe, the perforating mechanism is only designed to perforate a limited area of the amount payable line just sufficient for receiving the characters representing the dollars and cents payable. The type plate 160 is positioned to make its impression at the very end of the perforated area on the imperforate surface of the paper.

This has a decided advantage over perforating the area for the symbols, signature or other protecting matter or perforating this protecting matter in any manner for the reason that the perforation of the paper mutilates its surface to such an extent as to render illegible any symbol, signature, etc., having fine characters or lines. In the present arrangement I am enabled to print a protecting symbol or signature having very fine characters or lines, as illustrated at 163 and 164 in Figures 1 and 2. By disposing this plate 160 at the immediate end of the perforated area which receives the amount payable the protecting matter impressed by the plate also serves to limit or stop off the left hand end of the amount indicating characters to prevent the addition of characters or the alteration of the space occupied by the authorized characters. The right hand end is limited by the character "cts" on the units of cents type bar. The stationary mounting of the type plate has cooperation with the practice of inking the field or background for the reason that the inked field constitutes a protecting medium between the limiting matter impressed by the type plate and the first amount indicating character. It is hence not necessary to move these two together, such as by endwise movement of the type plate, to prevent the interposition of characters between the protecting matter and the authorized amount payable. I prefer to interpose symbols of characters in the intervening space, however, to cooperate with the inked field for giving a greater degree of protection against raising of the amount payable, and to this end the block 162 which receives the type plate 160 is provided with a $ symbol 165 for making a $ impression at the very end of the perforated area, and each type bar 29 is provided with a star symbol 166 at its upper end so that either a numeral character or the star symbol 166 must be brought into register with the printing line.

Figure 3:
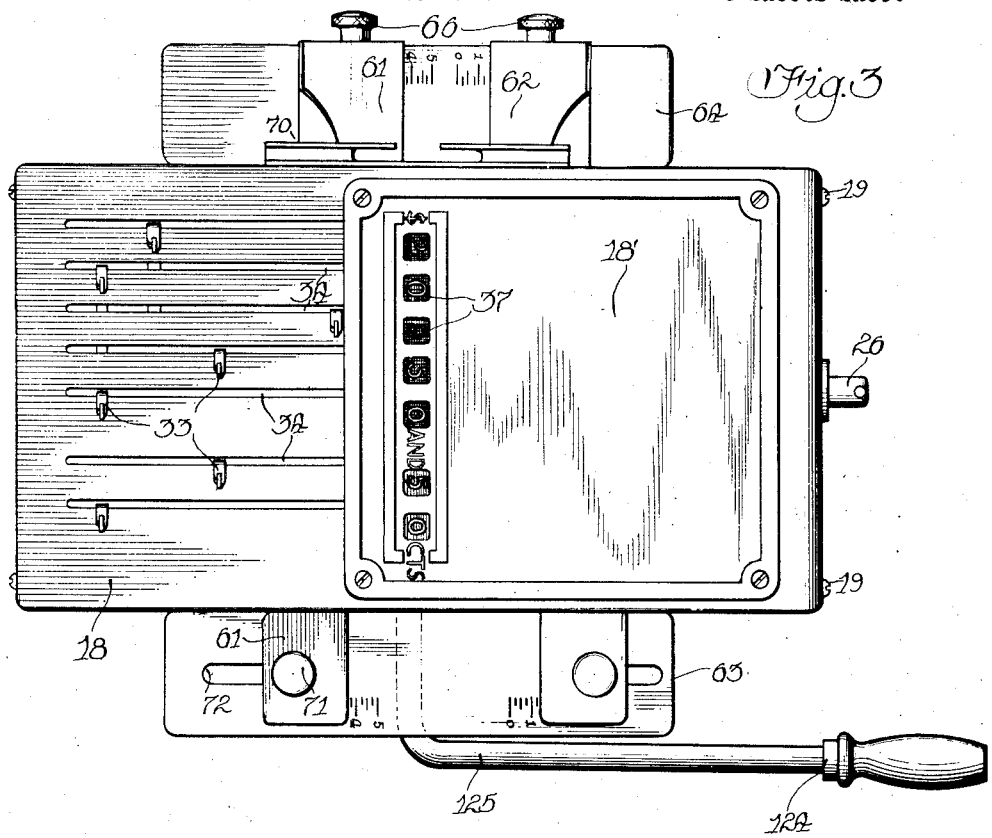
Figure 3 is a plan view of the present form of check writer.

The check or other instrument to be protected is inserted laterally through a transverse opening 55 extending entirely through the machine below the type bars 29, this opening being defined by the inclined slots 56 in the side walls of the housing and the coincident slots 56′ in the side frame plates 11—11′. The check is confined in the opening 55 between channel shaped guides 61 and 62 which embrace the edges of the check and extend through the machine from side to side thereof. These guides are adjustably supported on channel-shaped side plates 63 and 64 which are screwed to the side walls of the casing to extend horizontally therefrom. As shown in Figures 3 and 6 the ends of the check guides 61 and 62 which extend over the side plate 64 are bent downwardly as indicated at 65 in Figure 6, to receive thumb screws 66. These thumb screws are arranged for sliding adjustment in slots 67 in the outer flange of the side plate 64 in order that the spacing between the check guides 61 and 62 may be adjusted for different widths of checks. These thumb screws tap into threaded plates 68 which engage against the under side of the side plate 64, thus preventing rotation of the nut plates in the manipulation of these thumb screws. The ends of the check guides where the check is inserted are formed with vertical flanges 50 which are bent inwardly in in the form of depressed guide portions 60 which merge into the upper flange of the channel formations of the guides. The vertical flanges 50 and the sloping guide portions 60 facilitate the insertion of the check into the channel-shaped guides 61 and 62. The other ends of both check guides 61 and 62 are extended out over the side plate 63 and are each provided with a similar arrangement of thumb screw 71 having adjustment in a slot 72 in the plate 63. A stamping 70 is secured to the side plate 16′ by arms engaging in recesses in the upper edge of the side plate, this stamping having prominent indicating extensions 71—71′ which are bent upwardly from the bottom edge of the stamping to provide an intervening channel 70 70′. The stamping is so positioned that the lower inner corners of the indicating extensions 71—71′ indicate the "payee line" and the "amount line" as represented by the legends 72′ (Figure 14). The channel formation 70′ permits the end of the check to be inserted vertically into the stamping and lined up with the indicating legends for assisting in the spacing adjustment to be given the check guides, or may be used for holding a plurality of checks. Scale indicia 80 is arranged on the side plates 63 and 64 for cooperation with the ends of the check guides to show when the two check guides are exactly parallel and in a true right angle relation to the type bars so that all the selected type will register accurately along the "amount line." After these check guides are set for a given size of check, of course no further adjustment is necessary.

The inking mechanism, the perforating mechanism and the platen mechanism are disposed below the type bars 29 and are moved into and out of registration with the printing line x—x through the instrumentality of an oscillatory frame or cradle 54 with which each of these mechanisms has operative connection. The inking pad 57 for inking the type bars 29 and the type plate 160 is arranged to reciprocate above the check opening 55 and above the check when positioned therein. The perforating mechanism designated 58 in its entirety and the printing platen 59 reciprocate below the plane of the opening 55 so as to operate against the under side of the check when the same is positioned in the opening. Referring to the oscillatory frame or cradle 54, it will be noted from Figure 5 that this frame comprises a pair of upwardly extending pivoted arms 73 at one end of the machine and a similar pair of arms 74 at the other end of the machine. The arms of each pair are disposed adjacent the side walls of the frame 10, and each pair of arms are joined by integral horizontal bars 73′ and 74′ whereby both arms of each pair are joined together in the form of a yoke-shaped pivotal member. These arms or members are pivoted by transverse rods 75 extending through the side plates of the frame, and the two pairs of arms are connected together by links 76 extending along each side of the frame and pivotally connected to said arms by pins 77.

The inking pad 57 consists of a flat strip of felt mounted on a removable plate 78 to which this felt is secured by a flange 79 and cooperating tongue 79′ formed from the plate 78. The pad plate 78 is removably supported on a lower reciprocating plate 81, being detachably secured to this lower plate through the medium of a spring tongue 82 secured to the pad plate and provided at its outer resilient end with a rivet 83 engaging in a slot 84 in the lower plate 81. As shown in Figure 11, the slot 84 has a widened portion 84' and to releasably lock the pad plate in place the shank of the rivet 83 is formed with two diameters, the upper smaller diameter of the rivet shank being insertable through the outer reduced end of the slot 84 when the outer end of the tongue 82 is depressed, and the lower widened portion of the rivet shank being thereafter operative to raise up into the enlarged portion 84' of the slot and lock the pad plate to the lower plate 81. A guide rivet 86 also slides in the slot 84 and assists in guiding the pad plate into position. A metal tag 87 is carried on the outer end of the resilient tongue 82 bearing directions indicating the manner of removing and replacing the inking pad. Access is afforded to this pad through the removal of the end plate 17' of the housing, as hereinbefore described. The lower plate 81 is formed with downwardly extending arms 88 adjacent the outer sides thereof which are curved around a rod 89 extending between the upper ends of the two oscillating arms 74. The plate 81 is supported for horizontal reciprocating motion by having its two side edges rest upon the upper ends of a pair of arms 91 pivoted at 92 to the side walls 11—11' of the frame. These arms are also adapted to function as stop members for limiting the throw to the left of the arms 74, as indicated in dotted lines in Figure 5, and for the purpose of adjustably setting these arms for different degrees of throw of the oscillatory frame screws 93 are extended through the adjacent ends of the slots 56' to thread into the upper ends of the arms 91 and rigidly clamp the same to the side walls in any adjusted position. The throw of the oscillatory frame 54 in the other direction is likewise limited by a pair of arms or levers 94 pivoted at 95 and having screws 96 engaging in the slots 56' by which the arms or levers 94 may be clamped in any adjusted position. The two pairs of arms 91 and 94 are adapted to be so adjusted that when the oscillatory frame is in either of its extreme positions the inking and perforating mechanisms, or the printing platen, as the case may be, will be properly positioned to be raised into registration with the printing line. The oscillatory frame 54 has a snap motion over center in moving from one extreme position to the other through the action of a bowed spring 97 which has pivotal connection at one end with the rod 89 and at the other end in a U-shaped loop 98' formed in a transverse rod 98 rigidly secured to the side plates of the frame. This bowed spring tends to expand outwardly and thus performs a biasing function by tending to throw the oscillatory frame to the other extreme position as soon as the rod 89 passes over the vertical center line of the U-shaped loop 98'. The tension of the spring is sufficient to firmly hold the frame 54 in either extreme position during the perforating and printing operations.

Figure 12:
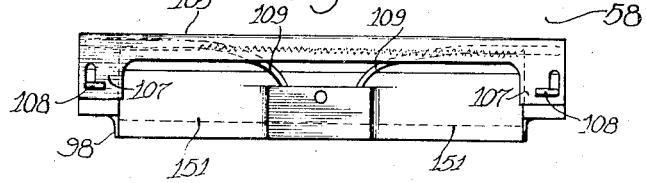
Figure 12 is a detail elevational view of the perforating mechanism.

The perforating mechanism 58 comprises a long narrow casting 98 extending substantially the distance between the frame side plates, and formed with two cored slots in each of which are mounted a plurality of relatively thin perforating plates 99 and 101. As shown in Figure 6, each of these perforating plates, is finely serrated along its upper edge to provide a plurality of fine, sharp perforating points 102. These perforating plates are spaced by shorter spacing plates 103 so that the perforations cut into the perforated areas of the check will be in even continuous rows. The group of perforating plates 99 is designed to perforate the area in which the amount payable is impressed, and the group of perforating plates 101 is appropriately spaced from the first group of plates to perforate the area in which the payee's name is written. If desired, different castings 98 may be substituted having different degrees of spacing between the group of perforating plates 99 and the group 101. As before described, the area in which the type plate 160 makes its impression is imperforate in order to avoid rendering the matter printed therein illegible, this being provided for by eliminating the perforating points from the left hand ends of the plates 99 as shown in Figure 12. The perforating mechanism is operatively connected with the oscillatory frame 54 through two arms 104 extending integrally from the casting 98 and having their ends curved upwardly to form hubs through which is passed the rod 89. The hubs on the ends of the arms 104 embrace the rod 89 between the centrally disposed biasing spring 97 and the arms 88 which carry the pad supporting plate 81. The casting 98 is supported in its lower position by the engagement of the corners thereof with the upper edges of the side links 76, along which the casting is free to slide in the reciprocatory motion thereof. Cooperating with the perforating points 102 is a stripper plate 105 which is spaced above the tops of the perforating points and is provided with slots 106 through which the perforating points are adapted to move in perforating the check. This stripper plate is guided for motion towards and away from the casting 98 through the provision of lugs 107 which extend down and embrace the sides of the casting 98. A wire 108 is extended across the back of the casting 98 and has its ends extending through holes in the lugs 107 which are aligned with corresponding holes provided in the ends of the casting 98. As shown in Figure 12 each of the holes in the lugs 107 is elongated in the form of a slot to permit relative motion between the stripper plate and the perforating points. The stripper plate 105 is normally held in raised position by two resilient springs 109, each of which has its ends set in holes on opposite sides of the casting 98 and has its intermediate loop portion extending up and around the flanged perimeter of the stripper plate to normally raise the same into its upper position. Cooperating with the perforating points 102 is a matrix plate 111 on the bottom of the pad supporting plate 81. This matrix plate has rows of individual matrix holes into which the individual perforating points 102 are adapted to closely fit so that the incision of the check by each perforating point is sharp and distinct with no tendency to tear the paper between successive perforations. It will be noted that as a result of the cooperation of the perforating points, which are very minute, and the matrix plate, which operates above the check, the multitudinous broken fibers of the paper produced by this perforating operation are all turned upwardly in ideal position for receiving the ink from the type bars 29 and for giving a relief effect to the type characters produced on the check.

The platen 59 which has reciprocatory connection with the other end of the oscillatory frame 54, comprises a strip of rubber 113 which is set into a recess in the upper edge of a bar 114 extending substantially the distance between the side plates of the frame. The bar 114 is reciprocated with, and in close proximity to the perforating mechanism 58, being supported by a pair of ribbed arms 115 formed integral with the bar 114. These arms extend back to a pivot rod 116 which passes between the upper ends of the oscillatory arms 73. Here the arms 115 are formed with an integral cross member 117 having hubs 118 engaging over the rod 116 adjacent the arms 73. The bar 114 is supported for reciprocating motion in its descended position by shoulders at the ends of said bar which bear upon the upper edges of the side links 76. A plate 119 is supported above the arms 115 by downwardly extending end members 121 which are curved about the rod 116 to have pivotal attachment therewith. The forward end of this plate is supported on top of the check guide 61 for reciprocating motion with the platen 59. This plate functions to depress that portion of the check away from tne type bars which is not in immediate impression contact with the platen. This action is illustrated in Figure 10, from which it will be noted that during the impression the forward edge of this plate folds the check downwardly along one side of the platen bar and the forward edge of the pad supporting plate 81 folds the check downwardly along the other side of the platen. The impression area on the check is thus sharply defined along the side edges of the platen and there is no smearing of the adjacent portions of the check from the type bars.

It is desirable that the operating mechanism within the frame 10 be capable of convenient assembly and disassembly for cheapness of production and facility of repairs and to this end the several pivot shafts and connecting rods extending through the side frame plates 11—11' are loosely supported in these plates so that they may be easily withdrawn or inserted. For example the pivot shafts 75—75 may be instantly withdrawn so that the oscillatory frame and its associated mechanisms may be conveniently removed. Similarly, the retaining rod 32 may be instantly withdrawn to permit convenient removal of the spacer bars 31 and in turn the type bars 29. These shafts and rods project sufficiently beyond the frame plates 11—11' to be confined against endwise disengagement from their openings in the frame plates by the side walls 16—16' of the housing. Other shafts and rods connecting with the operating mechanism are similarly removable, being merely confined by the housing, so that by the removal of the housing the greater portion of the operating mechanism can be quickly removed from the frame.

The operation of the check writer is performed through the actuation of an operating handle 125 which has an oscillatory motion on one side of the check writer through a range of approximately 180 degrees. The handle comprises a rod 125 which is bent to extend transversely through the center of the machine to form an operating shaft 125'. This operating shaft is located in the vertical plane of the printing line $x$—$x$ and is journaled in bearings 126 (Figure 6) which are set into the side plates 11 of the frame. Rigidly pinned to this operating shaft 125' on the outside of the side plates 11 are cams 127 adapted for engagement with outwardly bent flanges 128 on the lower ends of the levers 51. As hereinbefore described, there is provided a lever 51 on each side of the frame 10 for supporting the ends of the aligning rod 49. These levers are pivoted at their upper corners on pins 131 and are normally pressed downwardly into their lower positions (illustrated in dotted lines in Figure 8) by wire springs 129 secured to the side plates of the frame, the lower arms of these levers being confined against the frame plates by large headed rivets 132 which engage in slots 133 in the levers. The cams 127 are so positioned on the shaft 125' that the levers 51 are in their upper position with the aligning rod 49 withdrawn from the aligning recesses in the type bars when the operating handle 124 is in its forward and down position. This is the initial position which the operating motion, and is that position of the operating handle at which the check is adapted to be inserted into the machine. Each of the levers 51 is formed with an inclined cam surface 134 which cooperates with the tail extension 135 of a pivoted arm 136 pivoted to each side plate of the frame. This arm is formed with a check gripping finger 137 which is arranged to cooperate with an upper check gripping finger 138 which is punched outwardly from the side plate 11. A spring 139 normally tends to raise the arm 136 so as to bring the finger 137 up against the bottom of the check and grip the same between the fingers 137 and 138. This occurs when the operating handle 124 is swung upwardly from its initial position, the first part of this upward motion revolving the cams 127 out from under the flanges 128 whereby the two side levers 51 are allowed to descend. This draws the aligning bar 49 down into the aligning recesses on the type bars, thus positively aligning the bars, and also allows the two pivoted arms 136 on opposite sides of the machine to oscillate upwardly and grip the check between the pairs of fingers 137—138. The type bars are thus positively locked at their given setting and the check is firmly held against accidental displacement. The pairs of fingers 137—138 retain their grip upon the check through the perforating and printing operations and until the operating handle is revolved back to its initial position. By the provision of these fingers it is made impossible to insert the check after the operating handle has been moved from its initial position and thus there is no possibility of printing the check without first perforating it.

Rigidly mounted on the operating shaft 125' between the side plates 11 is a yoke member 141 which extends longitudinally of the shaft and has spaced hub members 142 at its ends which are pinned or otherwise fastened to the operating shaft. The opposite ends of the member 141 are formed with yoke arms 143—143 between which extend pivot shafts 144 and 145. Rotatably mounted on these shafts are separate pairs of rollers 146—146 and 147—147 which are spaced apart by spacing sleeves 148. In the normal lowered position of the operating handle 124 both pairs of rollers are in substantially vertical alignment in the position shown in Figure 5, with the pair of rollers 146 reposing between the end of the casting 98 of the perforating mechanism and the end of the bar 114 which supports the platen. The two pairs of rollers are adapted to alternately engage between opposing vertical faces 151 and 152 on the ends of the perforating mechanism and the platen mechanism respectively, whereby these mechanisms and the oscillatory frame 54 are given their to and fro motion. The end of the bar 114 is notched out in forming the vertical face 152 so as to provide a certain degree of clearance between the opposing faces 151 and 152.

Figure 4:
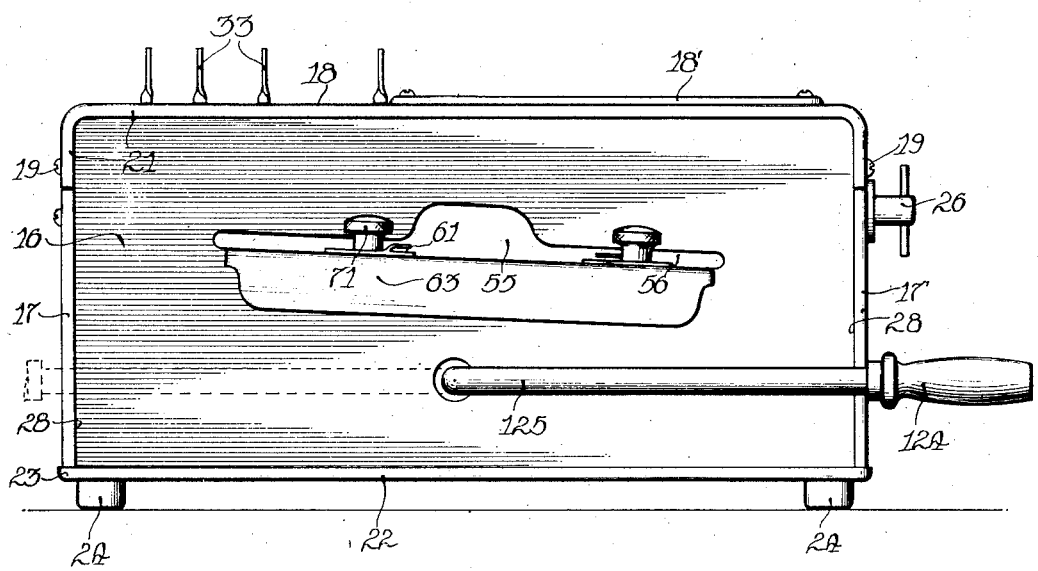
Figure 4 is a side elevation of the same.

In the operation of the check writer, after the check c has been inserted and the type bars have been given their proper setting, the operating handle 124 is first revolved upwardly and back into the position indicated in dotted lines in Figure 4. The beginning of this oscillation of the operating handle finds the rollers 146 engaging between the opposing faces 151 and 152 of the perforating and platen mechanisms, and as a result of the engagement of these rollers with the face 152 during their rotation to the left the platen bar and in turn the oscillatory frame 54 and inking pad and perforating mechanism are oscillated to the left, the biasing spring 97 completing the throw of the oscillatory frame and the stop arms 91 accurately positioning the perforating mechanism 58 for vertical movement into the plane of the printing line. The continued motion of the operating handle through its vertical position and downwardly to the rear brings the pair of rollers 147 up into engagement with the flat under surface of the casting 98, as illustrated in Figure 9, whereby the perforating mechanism 58 is raised upwardly against the bottom of the check c. The upward motion of the perforating mechanism raises the portion of check engaged, which in turn raises the inking pad 57 up into inking contact with the bottom of the type bars 29. When the inking pad 57 engages the bottom of the type bars the continued motion of the rollers 147 in moving through their upper dead center area raises the perforating points up through the stripper plate and through the check into the matrix 111. Simultaneously the inking pad is pressed under a slight pressure against the type bars 29. The exertion of too heavy a pressure against the perforating mechanism and inking pad in this operation is to be avoided as such may injure the inking pad and mar the check. When the operating handle is moved down to the limit of its backward throw the rollers 147 ride out from under the casting 98 of the perforating mechanism and allow the same to drop into the position indicated in dotted lines in Figure 9. On the return throw of the operating handle to its forward position these rollers 147 engage the vertical face 151 of the perforating mechanism and, with the aid of the biasing spring 97 transmit a complete reciprocation of the frame 54 and the associated mechanism to the extreme right hand position. Subsequently the rollers 147 move downwardly out of engagement with the face 151, and the other pair of rollers 146 move upwardly along the bottoms of the arms 115 of the platen bar and raise the same upwardly in the plane of the printing line. A depression 153 in the bottoms of the arms 115 momentarily delays the raising of the platen bar to give the proper timed relation, and thereafter the rollers 146 move out under the flat portion of the bar and raise the platen bar with great pressure against the bottom of the check, this pressure being readily obtainable without the exertion of much effort on the operating handle owing to the fact that the rollers 146 are at this instant moving through their dead center position in the printing plane. It is desirable to exert a relatively large pressure during this printing operation so that the printing platen will compress all of the raised fibres in the field back into the flat plane of the sheet and will thoroughly impregnate and compress the ink under the sizing of the paper and into the texture thereof. A further advantage derived from this relatively large pressure is that, by virtue of the resiliency of the rubber platen, the platen is compressed up into the recesses of the intagliotype between the relatively sharp edges of the type and thus cooperates with the perforations in producing sharp, prominent characters in relief. By mounting the platen on the oscillatory frame independently of the other mechanisms and by making the printing operation a separate operation it will be seen that this relatively large pressure can be readily exerted during the printing operation and a separate and distinct pressure exerted during the perforating and inking operations. The degree of pressure exerted is controlled by the engaging relation between the pairs of rollers 146 and 147 and the under surfaces of the casting 98 and of the arms 115. In the final step of the operation, the completion of the forward motion of the operating handle revolves the rollers 146 out from under the edge of the platen bar 114, whereupon this platen bar drops to its lower position and the operating parts resume their positions illustrated in Figure 5. The arched bridge 15 is adapted to be engaged by the rollers 146—147 to form a resilient limiting stop at both extremities of the throw of the operating handle.

The operation of first perforating the check results in a solid area of perforations 168 being produced in the "Pay to the order of" line (Figures 1 and 2) so as to entirely perforate the payee's name, and also results in a solid area of close perforations 169 being cut along the line on which the amount indicating characters are impressed so as to form a solid perforated area in which to produce the raised uninked characters. The perforations are very minute and each perforation produces a plurality of broken fibers raised above the plane of the sheet. The subsequent impression of the type bars upon the upper side of the perforated area 169 impregnates all of these upstanding paper fibers in the field surrounding the characters with ink and compresses these fibers back into the plane of the sheet so that the ink is forcibly compressed into all of the fibers of the perforated background under the very considerable pressure exerted by the printing platen 59. The raised fibers on the other hand, which are within the outlines of the intagliotype characters, are neither inked nor compressed but remain in relief, this effect of relief being further accentuated by the raising of the rubber platen into the incisions forming the type characters, as hereinbefore described. The impression of the protecting symbol or signature 163—164 occurs simultaneously with the printing of the amount indicating characters.

I do not intend to be limited to the particular details herein shown and described except as they are defined in the appended claims.

I claim:

1. In a device of the class described, the combination of perforating mechanism operative to first perforate a printing area on a check, and intaglio type operative to produce printing characters on said perforated area in a subsequent operation, said type having a substantially flat impression surface with the printing character recessed in and removed therefrom and the area of the impression surface surrounding the printing character being continuous and uninterrupted.

2. In a checkwriter, the combination of perforating mechanism operative to first perforate a printing area on a check, a plurality of printing members having their printing characters in intaglio, and a printing platen cooperating with said printing members for subsequently producing printing characters on said printing area in a separate operation, said printing members having substantially flat printing surfaces with the printing characters recessed and removed therefrom and the areas of the printing surfaces surrounding the printing characters being continuous and uninterrupted.

3. In a check writer, the combination of perforating mechanism, adapted to perforate the area of the check along the printing line, a plurality of adjustable printing members adapted to be brought into register with said printing line, a platen member cooperating with said printing members, said printing members having their type characters in intaglio for forming characters in relief in said perforated area, and operating mechanism operable to first actuate said perforating mechanism and to subsequently cause an impression between said printing members and said platen member, said type bars having substantially flat printing surfaces with the printing characters recessed in and removed therefrom and the areas of the printing surfaces surrounding the printing characters being continuous and uninterrupted.

4. In a check writer, the combination of perforating mechanism, adapted to perforate a solid area of the check at one operation along the printing line of said check, said perforating mechanism perforating said check from one side thereof to produce upstanding paper fibers on the opposite side of said check, a plurality of type bars adapted to be brought into registration with said perforated area upon said opposite side of the check, said type bars having their characters incised in intaglio for producing printing characters in relief in said perforated area, means for inking said type bars, and a printing platen adapted to engage on the first side of said check during the printing operation, said type bars having substantially flat printing surfaces with the printing characters recessed in and removed therefrom and the areas of the printing surfaces surrounding the printing characters being continuous and uninterrupted.

5. In a check writer, the combination of perforating mechanism adapted to perforate at a single operation a solid area of the check substantially coincident with the printing line thereon, said perforating mechanism being adapted to perforate through from the reverse side of the check to produce a solid area of raised paper fibers on the front side of the check, a matrix adapted to co-operate with said perforating mechanism upon the front side of said check, a plurality of adjustable type bars for printing in said perforated area from the front side of said check, said type bars having their type characters in intaglio, means for inking said type bars, a resilient printing platen cooperating with said intagliotype from the reverse side of said check, the intaglio characters on said type bars producing a compressed, inked surface from which the printing characters project in uninked relief, said type bars having substantially flat printing surfaces with the printing character recessed in and removed therefrom and the areas of the printing surfaces surrounding the printing characters being continuous and uninterrupted.

6. In a check writer, the combination of means for protecting the amount payable, and perforating means for protecting the payee's name by perforating the entire name and the amount payable area in a single perforating operation.

7. In a check writer, the combination of perforating mechanism adapted for perforating a definite area on the check, a plurality of type members for impressing characters in said perforated area for indicating the amount payable, and secondary perforating mechanism for perforating the check at a single operation the entire area of the check coincident with the payee's name and the amount payable area.

8. In a check writer, the combination of means for first perforating a definite area of the check, means for thereafter forming amount indicating characters in said perforated area, and means for impressing a symbol or other protecting matter on the check bearing a definite protecting relation to the drawer's signature simultaneously with the operation of forming the amount indicating characters in said perforated area.

9. In a check writer, the combination of a perforating member adapted to cut a solid field of perforations in the check, a plurality of printing members having their characters in intaglio and adapted to ink and compress the field of perforations surrounding the characters, and a printing member adapted to impress a symbol or other protecting matter having a protecting relation to the drawer's signature outside of said field of perforations.

10. In a check writer, the combination of perforating mechanism adapted to cut a solid field of perforations in the check from the reverse side thereof, a plurality of printing members having their characters in intaglio adapted to be impressed into said field of perforations from the front side of said check, the intaglio characters producing uninked characters in said perforated field having the effect of relief, a type plate in proximity to said printing members for impressing a symbol, the facsimile of a signature, or other protecting matter bearing a definite relation to the drawer's signature, said type plate making its impression at the immediate end of the field of perforations to limit or stop-off the amount indicating characters therein.

11. In a check writer, the combination of perforating mechanism for perforating a solid area of the check, printing mechanism for producing printed characters in the perforated area of the check, and means for forming a symbol or other printed matter on said check for protecting the signature thereon, said check remaining in a substantially stationary position during the perforating, printing and protecting operations.

12. In a check writer, the combination of means for restraining the check in predetermined position, perforating mechanism for perforating a definite area of said check from the reverse side thereof while said check is in said predetermined position, secondary perforating mechanism for simultaneously perforating the payee's name, printing members having intagliotype characters formed therein, said printing members being impressed in said perforated area from the front side of said check while said check is maintained in said predetermined position, and means for impressing a trade symbol, the facsimile of a signature, or other printed matter on the front side of said check while said check is in said predetermined position.

13. In a check writer, the combination of perforating mechanism, type elements having printing characters adapted to be brought into register with a printing line, a printing platen for cooperating with said printing characters, and means for moving said perforating mechanism and said printing platen laterally into and out of registration with said printing line.

14. In a check writer, the combination of perforating mechanism, a plurality of type elements having printing characters adapted to be brought into register with a printing line in said check writer, inking mechanism adapted to cooperate with said type elements along said printing line, a printing platen, and means for moving said perforating mechanism, said inking mechanism and said printing platen laterally into and out of registration with said printing line in predetermined sequence.

15. In a check writer, the combination of printing members having type thereon adapted to be brought into register with a printing line in said check writer, perforating mechanism for perforating the check, a printing platen for cooperating with said printing members, and means for alternately reciprocating said perforating mechanism and said printing platen into and out of registration with said printing line.

16. In a check writer, the combination of a plurality of printing members defining a printing line in said check writer, inking mechanism for inking said printing member, perforating mechanism for perforating a predetermined area of the check, a printing platen for cooperation with said printing members, and means for laterally reciprocating said inking mechanism and said perforating mechanism into register with said printing line for simultaneously inking said printing members and perforating the check, and for thereafter laterally reciprocating said platen into registration with said printing line for making the impression.

17. In a check writer, the combination of printing members having printing characters thereon, perforating mechanism, inking mechanism, a printing platen, and an oscillatory frame on which said perforating mechanism and said inking mechanism and said printing platen are supported for operative motion into and out of operative relation with the check and with said printing members.

18. In a check writer, the combination of a plurality of type elements having printing characters thereon adapted to be brought into register with a printing line in said check writer, perforating mechanism for perforating the check, a printing platen for cooperating with said type elements, and an oscillatory frame on which said perforating mechanism and said platen are supported, said oscillatory frame alternately moving said perforating mechanism and said platen into and out of operative registration with said printing line.

19. In a check writer, the combination of a plurality of printing members having printing characters adapted to be brought into register with a printing line in said check writer, an oscillatory frame, perforating mechanism carried by said frame, a printing platen carried by said frame, operating means for oscillating said frame to bring said perforating mechanism and said printing platen into and out of association with said printing line, and means for moving said perforating mechanism or said printing platen into engagement with the check.

20. In a check writer, the combination of a plurality of printing characters adapted to be brought into register with a printing line, a movable frame below said printing characters, perforating mechanism carried by said frame, a printing platen carried by said frame, and operating mechanism for moving said frame and for raising either said operating mechanism or said printing platen into engagement with the check.

21. In a check writer, the combination of a plurality of printing characters adapted to be brought into register with a printing line in said check writer, an oscillatory frame having oscillating motion laterally with respect to said printing line, perforating mechanism carried by said frame, a printing platen carried by said frame, operating mechanism for oscillating said frame to bring either of said mechanisms into registration with said printing line, and spring means cooperating with said operating means for controlling the motion of said oscillatory frame.

22. In a check protector, the combination of an oscillatory frame, perforating mechanism carried by said frame, a printing platen carried by said frame, operating mechanism for oscillating said frame, and spring means operating to control said frame at the limits of its motion.

23. In a check writer, the combination of an oscillatory frame, perforating mechanism carried by said frame, a printing platen carried by said frame, operating means for oscillating said frame for bringing either said perforating mechanism or said printing platen into operative position, and a biasing spring connected to said frame for completing the oscillatory motion of said frame in either direction.

24. In a check writer, the combination of an oscillatory frame, perforating mechanism carried by said frame, a printing platen carried by said frame, operating means for oscillating said frame over its center of oscillation, a biasing spring connected to said frame for completing the oscillatory motion of said frame in either direction, and means for moving said perforating mechanism or said printing platen into engagement with the check relative to said frame.

25. In a check writer, the combination of a plurality of printing characters adapted to be brought into register with a printing line, an oscillatory frame below said printing characters and having oscillating motion laterally to said printing line, perforating mechanism carried by said frame, a printing platen carried by said frame, inking mechanism movable with said frame, and an operating mechanism for oscillating said frame to bring either said perforating mechanism or said printing platen into association with said printing line, said operating means comprising cam means for raising either said perforating mechanism or said printing platen into engagement with the check.

26. In a check writer, the combination of a plurality of type bars having printing characters thereon adapted to be brought into register with a printing line in said check writer, an oscillatory frame below said type bars and oscillating laterally with respect to said printing line, perforating mechanism carried by said oscillatory frame, an inking pad carried by said oscillatory frame, a printing platen carried by said oscillatory frame, operating mechanism for oscillating said frame for alternately bringing said inking and said perforating mechanism or said printing platen into association with said printing line, a biasing spring connected to said frame for completing the oscillatory throw thereof, said operating means operating to raise either said perforating mechanism or said printing platen into register with said printing line.

27. In a check writer, the combination of perforating mechanism, a printing platen, an operating shaft, an arm extending from said shaft, said arm being operative to move either said perforating mechanism or said printing platen relative to a predetermined operating position of both, and being operative to move one of said elements transversely to bring it into operative engagement with the check.

28. In a check writer, the combination of a plurality of printing characters adapted to be brought into register with a printing line in said check writer, perforating mechanism, an operating shaft, and means on said operating shaft operative to move said perforating means horizontally into and out of association with said printing line and to raise said perforating means vertically into engagement with the check when in association with said printing line.

29. In a check writer, the combination of a plurality of printing characters adapted to be brought into register with a printing line in said check writer, perforating mechanism, a printing platen, an operating shaft, a pair of operating arms extending from said shaft and being operative to move either said perforating mechanism of said printing platen horizontally into association with said printing line, said operating arms also operating to raise either of said elements when in association with said printing line vertically into engagement with the check.

30. In a check writer, the combination of a plurality of printing characters adapted to be brought into register with a printing line in said check writer, an oscillatory frame moving laterally relative to said printing line, perforating mechanism carried by said frame, a printing platen carried by said frame, an operating shaft, and operating arms extending from said shaft and adapted to oscillate said frame to move either said perforating mechanism or said printing platen into substantial registration with said printing line, said operating arms being subsequently operative to move the element in registration with said printing line transversely or in the plane of said printing line.

31. In a check writer, the combination of a plurality of printing characters adapted to be brought into register with a printing line in said check writer, an oscillatory frame oscillating horizontally, a perforating element carried by said frame, a platen element carried by said frame, an operating shaft, and operating arms extending from said shaft and adapted to engage either of said elements for moving the same horizontally into and out of substantial registration with the printing line, said operating arms also functioning to move the element which is in registration with said printing line vertically into cooperating engagement with the check.

32. In a check writer, the combination of a plurality of printing characters, adapted to be brought into register with a printing line in said check writer, an oscillatory frame below said printing characters and adapted for horizontal oscillation, an inking element carried by said frame, a perforating element pivotally connected to said frame, a platen element pivotally connected to said frame, an operating shaft, operating arms carried by said shaft and extending at diverse angles, rollers carried by said arms, means for oscillating said shaft, opposing surfaces on said perforating element and said platen element between which said rollers are adapted to engage for oscillating said frame and said elements horizontally, and lift surfaces on the bottoms of said perforating elements and said platen elements, said rollers being adapted to engage said lift surfaces when either of said latter elements is in registration with said printing line and to raise said elements into operative engagement with said check.

33. In a check writer, the combination of a plurality of type members, an inking pad for inking said type members, a plate upon which an inking pad is mounted, a movable member for moving said pad into and out of operative engagement with said type members, a releasable pin and slot connection for releasably locking said pad plate to said member, and a tongue extending from the end of said pad plate for releasing said pin and slot connection.

34. In a check writer, the combination of a plurality of type members, an inking pad for inking said type members, a pad plate on which said pad is mounted, a supporting member adapted to move said pad into and out of operative engagement with said type members, a resilient tongue secured to said pad plate, a pin extending from said tongue, said pin having a reduced portion, said supporting member having a slot therein formed with an enlargement and adapted to receive said pin, the reduced portion of said pin being insertable in the end of said slot and the large portion thereof interlocking in the enlargement of said slot.

35. In combination, type members defining a printing line, perforating mechanism for perforating the check, a printing platen for cooperating with said type members, and means for oscillating said perforating mechanism and said printing platen laterally into and out of operative association with said printing line.

36. In combination, a plurality of printing members defining a printing line, inking mechanism cooperating with said printing members, perforating mechanism for perforating a predetermined area of the check, a printing platen for cooperating with said printing members, and oscillatory mechanism having operative association with said perforating mechanism and said printing platen for moving the same laterally into and out of registration with said printing line.

37. In a check writer, the combination of perforating mechanism for perforating the check, printing mechanism for impressing characters in the perforated area of the check, and operating means exerting different degrees of pressure on said perforating mechanism and on said printing mechanism.

38. In a check writer, the combination of a plurality of printing members defining a printing line in said check writer, perforating mechanism for perforating a predetermined area of the check, a printing platen for cooperating with said printing members, and operating mechanism for relatively moving said perforating mechanism and the check into operative engagement under a relatively light perforating pressure, and for relatively moving said printing platen and the check into operative engagement under a relatively heavy impression pressure.

39. In a check writer, the combination of printing members having incised type for producing characters on the check, and a resilient platen cooperating with said printing members for expanding the paper into said incised type for giving relief to the characters formed on said check.

40. In a check writer, the combination of perforating mechanism for first producing a solid field of perforations in the check and struck upwardly from the reverse side of the check, a plurality of printing members having intagliotype incised therein, said printing members being adapted to produce characters in the perforated area of the check from the front side thereof, inking mechanism for inking said printing members, and a resilient platen adapted to engage the reverse side of the check for inking and compressing the perforated field surrounding the characters, the incisions in said intagliotype permitting the raised fibers within the type character to remain erect for giving the effect of relief.

41. In a check writer, the combination of a plurality of printing members having intagliotype characters therein adapted to be brought into registration with a printing line in said check writer, perforating mechanism for perforating the check, a printing platen for cooperating with said printing members, said intagliotype printing members inking in solid color the entire field surrounding the uninked type characters, and a type plate at one end of said printing line in stationary position, the impression produced by said type plate being located immediately at the end of said solid color field and serving to limit or stop-off the characters in said solid color field.

42. In a check writer, the combination of a plurality of movable printing members having type characters thereon adapted to be brought into registration with a printing line in said check writer, an aligning member adapted to engage said printing members for aligning the selected type characters, gripping mechanism for holding the check in a substantially stationary position, an operating member, and a lever controlled by the position of said operating member and having operative connection with said aligning member and with said gripping mechanism for actuating the same.

43. In a check writer, the combination of a plurality of printing members having type characters adapted to be brought into registration with a printing line in said check writer, an aligning bar adapted to engage said printing members and positively align the selected type characters, a pair of fingers on each side of said check writer for gripping and holding the check against displacement, levers pivoted on each side of said check writer and having operative connection with said aligning bar and with said pairs of gripping fingers, an operating shaft, and cam means on said shaft for oscillating said pivoted levers.

44. In a check writer, the combination of a plurality of parallel, longitudinally reciprocable type bars, a plate superposed above said type bars and having parallel slots therein, operating fingers extending from said type bars and projecting through said slots, said slots being formed at their ends to permit separation of said operating fingers from said slots, and a removable cover plate blocking off the ends of said slots.

45. In a check writer, the combination of a housing having a transverse opening therethrough for receiving the check, a pair of spaced check guides extending through said transverse opening and projecting from the sides of said housing for receiving the check, said check guides being relatively adjustable toward and away from each other, and means for clamping the same in adjusted position.

46. In a check writer, the combination of a housing having a check receiving opening intermediate the ends of said housing and extending transversely through the same, plate members projecting laterally from the sides of said housing below said check opening, a pair of check guides in spaced relation extending through said check opening and projecting out over said plate members, and clamping means for adjustably clamping said check guides to said plate members.

47. In a check writer, the combination of a housing having a check receiving opening extending transversely therethrough, a registration point carried by said housing with which a predetermined part of the check is adapted to register when inserted in said opening, and check guides extending through said opening in spaced relation and being adjustable toward and away from said registration point.

48. In a check writer, the combination of a plurality of longitudinally reciprocable type bars, a plate superposed above said type bars and having a series of parallel slots formed therein, operating fingers extending from each of said type bars upwardly through certain of said slots, indicating slides associated with each of said type bars and bearing characters for indicating the positions of said type bars, a supporting member for supporting and guiding said slides, said slots having enlarged openings at their ends to permit the removal of said plate over the ends of said operating fingers and over said supporting members, and a removable cover plate supported above said first plate for closing off the enlarged openings at the ends of said slots.

49. In a check writer, the combination of a frame comprising two parallel frame plates, operating mechanism within said frame comprising a plurality of shafts extending transversely to said frame plates and being supported in openings in said frame plates, said shafts being freely slidable into and out of their corresponding openings in said frame plates to permit convenient assembly and disassembly of said operating mechanism, and an exterior housing enclosing said frame and comprising housing walls spaced from said frame plates, said housing walls confining said shafts against endwise removal from their openings in said frame plates.

50. In a check writer, the combination of a plurality of printing members having type characters adapted to be brought into registration with a printing line in said check writer, an inking pad for inking said printing members, perforating mechanism comprising two spaced sets of perforating points for perforating the payee's name and the area of the check in which the amount indicating characters are impressed, a stripper plate resiliently supported on said perforating mechanism, a matrix moving with said inking pad for receiving said perforating points, and operating mechanism for simultaneously moving said inking pad and said perforating mechanism laterally into and out of operative association with said printing line.

51. In a check writer, a plurality of type members having characters adapted to be brought into registration with a printing line in said check writer, a printing platen for making an impression on the check along said printing line, and movable members cooperating with said printing platen on each side of said printing line for preventing other portions of the check than the portion in registry with said type characters from coming into contact with said printing members.

52. In a check writer, a plurality of longitudinally movable type bars having type characters adapted to be aligned with a printing line in said check writer, a printing platen movable into and out of association with said printing line for making the impression on the check, and a plate member moving with said platen for bending that portion of the check away from the type bars which is not in impression contact with the platen.

53. In a check writer, a plurality of longitudinally movable type bars having type characters adapted to be aligned with a printing line in said check writer, an inking pad member, a printing platen, a plate moving with said printing platen, said pad member and said plate operating to bear upon the check on each side of said platen during the impression to prevent contact of the check with said type bars except along said printing line.

54. In a check writer, the combination of a housing having an opening for receiving the check, a pair of check guides cooperating with said opening, one of said check guides being adjustable relative to the other, and indicating means for indicating the parallel or non-parallel relation between said guides.

55. In a check writer, the combination of a housing having an opening for receiving the check, a pair of check guides extending through said opening, one of said check guides being adjustable relative to the other, and scale indicia for indicating the relation between said check guides.

56. In a check writer, the combination of printing mechanism adapted to make an impression along a printing line, adjustable guide means for guiding the check, and registration means for indicating said printing line, said registration means being adapted to receive the check for disposing the same in proper position for the adjustment of said guide means.

57. In a device of the class described, the combination of a frame, protecting mechanism carried thereby for protecting the amount payable, a relatively thin printing plate adapted to impress a symbol or other printed matter on the check, a supporting member carried by said frame, and means cooperating with said supporting means for releasably holding said printing plate to said supporting means, said holding means comprising bevel edges at opposite sides of the plate and a dove-tail groove in the supporting member for receiving the bevel edges of the plate, permitting convenient removal and substitution of printing plates.

58. In a check writer, the combination of a machine frame, protecting mechanism for protecting the amount payable, a supporting member carried by said frame, a relatively thin printing plate adapted to be carried by said supporting member and having a figure or type for impressing a symbol or other protecting matter on the check for protecting the drawer's signature, said supporting member holding said printing plate stationary during the entire operation of the check writer, and means releasably holding said printing plate to said supporting member and arranged whereby said printing plate can be quickly withdrawn from the exterior of the check writer for ready substitution of printing plates, said means comprising bevel edges on the printing plate and a dove-tail groove in said supporting member.

59. In a check writer, the combination of a housing, protecting mechanism for protecting the amount payable, a supporting member, a printing plate adapted to be carried thereby and having a protecting figure or type for making a protecting impression on the check, said housing having an opening therein in proximity to said supporting member through which printing plate is accessible from the exterior of said housing, and means for releasably holding said printing plate to said supporting member, whereby said printing plate can be readily withdrawn from said supporting member through the opening in said housing for substitution of printing plates, said means comprising bevel edges on the printing plate and a dove-tail groove in the supporting member for receiving the bevel edges of said plate.

60. In a device of the class described, the combination of check protecting mechanism, a movable support for said check protecting mechanism permitting movement of the latter relative to the printing line, and adjustable stop means for controlling the motion of said movable support.

61. In a device of the class described, the combination of check protecting mechanism, a movable support for said check protecting mechanism having oscillatory movement relative to the printing line in the machine, and adjustable stop means for controlling the motion of said movable support at each limit of its path.

62. In a device of the class described, the combination of printing member, perforating mechanism, an oscillatory frame for throwing said perforating mechanism into and out of operative position, and adjustable stop means for controlling the limit of throw of said frame.

63. In a check writer, the combination of a plurality of printing members, an oscillatory frame, perforating mechanism, a printing platen, an oscillatory frame supporting said perforating mechanism and said printing platen and operable to move the latter into and out of the printing line, and adjustable stop means controlling the limits of throw of said frame for properly aligning said perforating mechanism and said printing platen with the check.

64. In a check writer, the combination of a housing having two side walls, a check receiving slot extending transversely of said two side walls, means adapted to engage one longitudinal edge of the check for aligning the same in said slot, and means adjustably supporting said last named means for shiftable movement alongside of one of said side walls.

65. In a check writer, the combination of a housing having two side walls, a check-receiving slot extending transversely through said two side walls, ledges projecting laterally from said side walls below said slot, and check-guiding means supported on said ledges and movable along the same alongside of said side walls.

66. In a check writer, the combination of a housing having two side walls, a check-receiving slot cut through said side walls transversely of the housing, ledges projecting laterally from said side walls below said slot, members adapted to be engaged by the check supported on said ledges, and pin means projecting from said members and engaging in slots in said ledges for adjustably holding said members to said ledges.

67. In a check writer, the combination of a housing, a check-receiving opening associated therewith, check protecting mechanism in said housing, a shaft for operating said check protecting mechanism, a gripping member adapted to engage and hold the check in said check receiving opening, and cam means on said shaft for actuating said gripping member.

68. In a check writer, the combination of a housing, a check receiving opening associated therewith, check protecting mechanism in said housing, a shaft for operating said check protecting mechanism, a gripping finger movable to engage and hold the check in said opening, a cam on said shaft, and a lever intermediate said cam and said gripping finger.

69. In a machine of the class described, a swingable inking pad, a swingable perforator, a longitudinally moving shaft for supporting the same in superimposed relation, a swingable platen connected for longitudinal movement with said shaft, and means for simultaneously shifting and elevating the inking pad and perforator and thereafter shifting and elevating the platen for the purpose described.

70. In a machine of the class described, the combination with interconnected shiftable inking pad and platen, of a line of type, limiting means for arresting said pad or platen in operative relation to said type, and an oscillatable shaft having means thereon for alternately shifting and elevating said pad and platen in operative relation with said type.

71. In a check writer, a check guideway, means for perforating and printing a check, an operating device therefor, check gripping means adjacent said guideway, and means operable by said device for releasing said gripping means after the check has been printed.

72. In a check writing machine having a check guideway therein, an abutment adjacent said guideway, a lever pivoted below said guideway, yielding means for urging one arm of said lever into contact with said abutment for gripping a check therebetween, and operating means for engaging the other arm of said lever for disengaging the first arm from said abutment.

73. In a check writer, the combination of a casing having a check receiving slot therein, a plurality of type elements in said casing, an operating handle for making the impression between the check and said type elements, and gripping mechanism below the level of said slot and operable to grip the check upon the movement of said operating handle, said gripping mechanism comprising a gripping member adapted to move up into said slot for gripping the check.

In witness whereof I hereunto subscribe my name this 27th day of June, A. D., 1921.

GEORGE M. WILLIS.